Nov. 19, 1957 R. P. WOOLLEY 2,813,425
INSTRUMENT FOR MEASURING THE RATE OF CHANGE OF TEMPERATURE
Filed Nov. 10, 1954
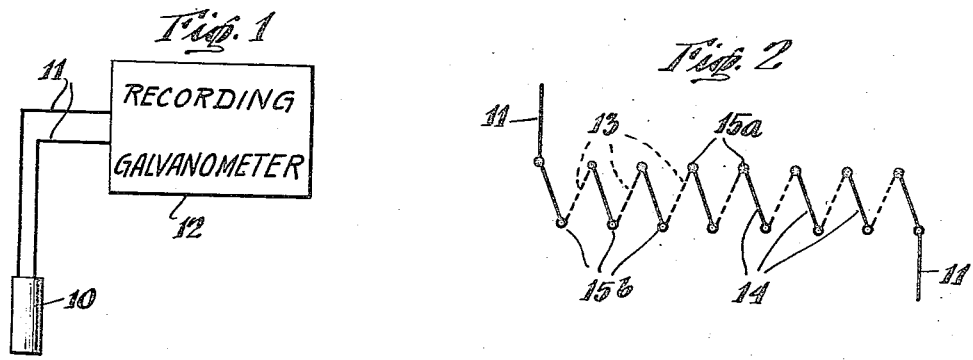
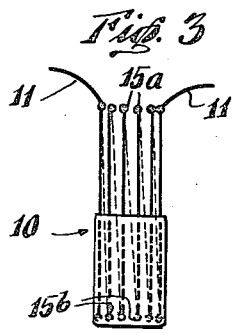
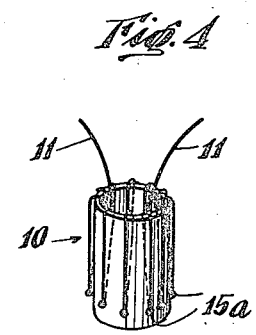
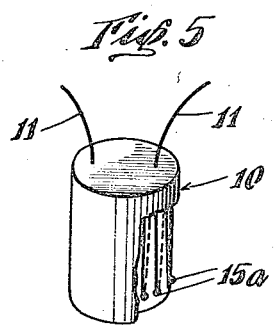
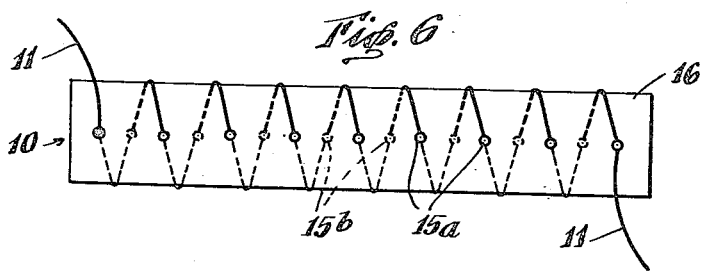
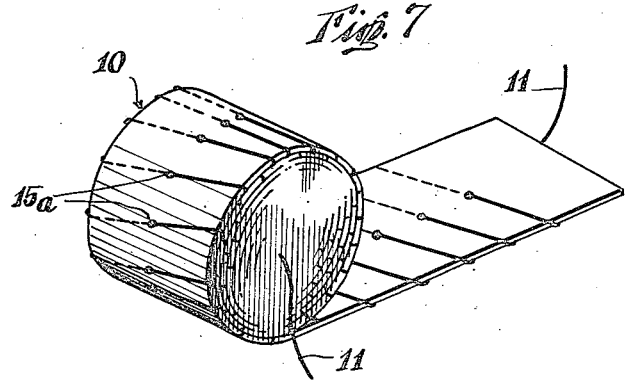
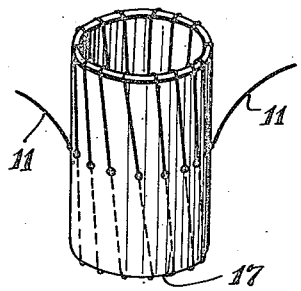
INVENTOR
Richard P. Woolley
BY
James G. Cleveland
ATTORNEY United States Patent Office 2,813,425
Patented Nov. 19, 1957

2,813,425

INSTRUMENT FOR MEASURING THE RATE OF CHANGE OF TEMPERATURE

Richard P. Woolley, Kew Gardens, N. Y., assignor to Socony Mobil Oil Company, Inc., a corporation of New York Application November 10, 1954, Serial No. 468,056

1 Claim. (Cl. 73—341)

This invention relates generally to temperature measuring or indicating devices and, more particularly, to a device for measuring the rate of change of temperature.

Many laboratory tests, chemical reactions, and industrial processes require a measurement of, or the control of, the rate of change of the temperature. Examples are: flash point tests; freezing point tests; chemical reactions which require heating or cooling; and the rate of change of temperature of elements subjected to friction such as bearings. The instant invention is directed to a device for measuring the rate of change of temperature by producing a voltage which is proportional to the time rate of temperature change of the environment. The device is in the form of a small, compact, sensing element that depends for its operation on the principle of the thermopile. Conducting leads are provided for connecting the temperature sensing device to a recording galvanometer, meter, or other indicating device, which may be calibrated in terms of rate of change of temperature. Therefore, the primary object of this invention resides in the provision of a small, compact and extremely sensitive device which will respond to the rate of change of temperature of a particular environment. Other objects and advantages of the instant invention will become apparent from the following detailed description, when considered with the drawings in which:

Figure 1 is a schematic diagram showing the rate of change of temperature sensing device connected to a continuous recording type of galvanometer;

Figure 2 shows a metallic element and its manner of construction;

Figure 3 shows the sensing element at one stage in its development;

Figure 4 shows the sensing element in another stage of its development;

Figure 5 shows the sensing element, partly in fragmentary section, in its completed form;

Figure 6 shows the modified form of the sensing element in one stage of its development;

Figure 7 shows the modified form of the device in another stage of its development; and Figure 8 shows a third modification of the sensing device.

Referring to the drawings in detail, particularly Figure 1, there is shown the rate of change of temperature sensing device 10 connected by conductors 11 to a continuous recording type of galvanometer 12.

As shown in Figure 2, the metallic portion of the sensing element 10 may be formed of iron and constantan wire. Although the size is not critical, size number 30, B and S gauge, has been found to be suitable. The dashed lines 13 represent the iron wire and the solid lines 14 represent the constantan wire. The wires are cut into pieces that are, for example, 1.5 cm. long and welded together, as shown in the drawings at the junctions 15a and 15b. The entire element is then coated with an insulating material, such as collodion, or a quick drying enamel which will withstand the environment temperature to which the device is to be subjected. The element is then collapsed in accordion fashion to form a bundle, as shown in Figure 3, having the junctions 15b and the entire lower half of the bundle enclosed in, first, an insulating tape, and then with a heavy coating of collodion or enamel. The upper half of the wires having the junctions 15a are then bent outwardly and downwardly about the insulaed lower half of the element, as shown in Figure 4. The entire device is then heavily coated with collodion, or enamel, to thereby provide the finished rate of change of temperature sensing device shown in Figure 5, which has alternate junctions inside and outside of the bundle. Since alternate junctions of the sensing device are separated by a substantial thickness of insulating material, the device will produce a voltage, when placed in an environment of temperature change, that is directly proportional to the temperature differential between the outside and the inside of the bundle. As shown in Figure 1, the voltage produced by the device may be continuously recorded by a recording galvanometer or it may be indicated by any of the well known metering devices.

In Figure 6 there is illustrated a modified form of the rate of change of temperature sensing device in one stage of its development. As shown in this figure, the iron and constantan wires are butt-welded together in the manner described in connection with Figure 2 and the long piece of wire so formed is wounded about a thin strip of insulating material 16 so that alternate junctions will fall in line on opposite sides of the strip. Any desired length of strip can be wound. Then, when a sensing element having a specified sensitivity is desired, it is only necessary to cut from the long strip the portion having the desired number of junctions. Then the leads 11 are secured to the opposite ends of the wire. As shown in Figure 7, the thin insulating strip carrying the wire thereon is rolled into a bundle and the entire bundle heavily coated with collodion or a suitable insulating enamel.

Still another modification of the rate of change of temperature sensing element is shown in Figure 8. The metallic element is formed in the same manner as described in connection with the foregoing figures. The long piece of wire, formed by butt-welding the iron and constantan wires, is wound on a form 17 that is cylindrical in shape, alternate junctions falling inside and outside of the cylinder. The entire device is then heavily coated with collodion, or a suitable enamel. By forming the device in this manner, its time constant can be appreciably reduced. By continuing the winding process until the inside of the cylindrical form is completely filled, an instrument of high sensitivity can be developed.

In addition to measuring the rate of heating or cooling of a medium undergoing treatment, the instant invention has various other applications. It can be used for the determination of freezing points; to follow the course of a chemical reaction; the output voltage from the sensing element could be fed into an amplifier, the output of which may be used to control the supply of coolant or heat for a medium undergoing treatment; to actuate a relay to give an alarm; and to determine the rate of change of temperature of a bearing in which a shaft or other means is turning. Obviously, the instant invention has various other applications than those enumerated above.

Having thus described this invention, what is claimed to be new and on which it is desired to secure Letters Patent of the United States, is:

A device for measuring the first time derivative of temperature that comprises a substantially cylindrical element formed of a material having predetermined heat conducting characteristics; means for closing one end of said cylindrical element; a metallic element, said metallic element being formed by connecting end to end short lengths of wire of two dissimilar metals, alternate lengths of which are formed of one metal and the remaining links are formed of the other metal, said metallic element being arranged to form a bundle, one end of said bundle consisting of cold junctions being embedded in thermal insulating means and disposed within the cylindrical element and the other end of the bundle having the hot junctions of the wire comprising the bundle bent outwardly and down against the exterior wall of the cylindrical element; means for completely enclosing the cylindrical element and metallic element, and a pair of electrical conductors extending from the ends of the metallic element outside the enclosure whereby an electrical indicator can be attached thereto.

References Cited in the file of this patent

UNITED STATES PATENTS

| | | |
|---|---|---|
| 880,272 | Bristol | Feb. 25, 1908 |
| 1,643,582 | Martin | Sept. 27, 1927 |
| 1,837,853 | De Florez | Dec. 22, 1931 |
| 2,054,120 | De Florez | Sept. 15, 1936 |